Sept. 1, 1953   C. M. TOWNSEND   2,650,865
ANTIFRICTIONAL BEARING OF THE LOAD BALL TYPE
Filed Sept. 24, 1952
Fig. 1.
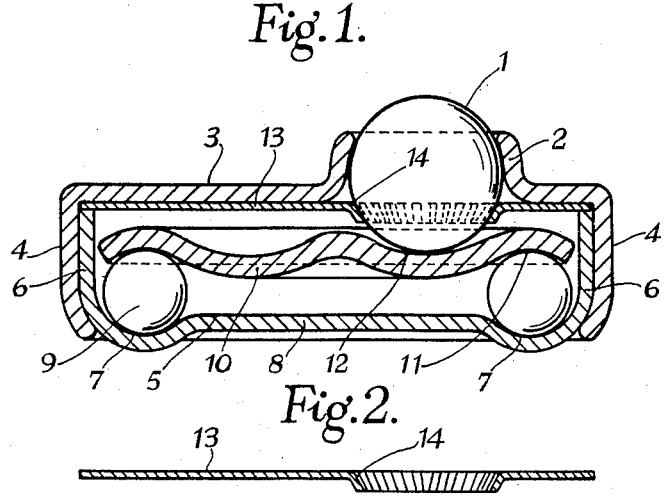
Fig. 2.
Fig. 4.
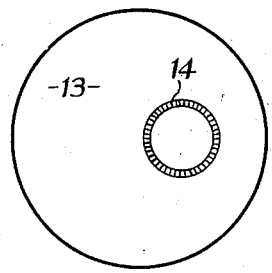
Fig. 3.
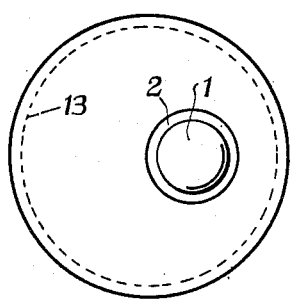
INVENTOR
Claude Mortimer Townsend
BY
Richardson, Davis and Norden
his ATTORNEYS Patented Sept. 1, 1953

2,650,865

UNITED STATES PATENT OFFICE 2,650,865

ANTIFRICTIONAL BEARING OF THE LOAD BALL TYPE

Claude Mortimer Townsend, Birmingham, England

Application September 24, 1952, Serial No. 311,250
In Great Britain June 26, 1952

2 Claims. (Cl. 308—227)

This invention relates to an anti-frictional bearing device of that kind in which a load-contact ball is located to revolve within, and project from, an eccentrically disposed locating sleeve provided in a cap which closes a cup-like body and to frictionally contact a table disposed coplanar between the cap and cup to freely revolve upon a ring of anti-friction balls arranged concentric with said cap and within the cup and eccentrically to the load ball and sleeve.

Such a bearing device has many uses for moving loads and is often placed to work under bad conditions of dust and heat, and it is the experience of users that its lubrication becomes inefficient and its moving parts clogged by entry of foreign matter, and it is the object of the invention to prevent or minimise such undesirable happenings.

The essential feature of my improved combination, as hereinafter stated, is the use in such a bearing of a washer of suitable material retained in the cover and pierced with a hole of smaller diameter than the diameter of the load ball and operative to exert slight outward pressure on the load ball to maintain its resiliency in contact with the eccentric sleeve in the cover when the load ball is not bearing a load, to thereby prevent the escape of lubricant and to ensure the non-entry of foreign matter. The hole in the washer may be provided with a resilient flange extending inwardly to contact the load ball, and this flange may be of a spring-tongued construction or one having inherent resiliency, the main purpose of the washer being to prevent loss of lubricant and to prevent the entry of foreign matter between the load ball and the sleeve, but furthermore to provide light resilient contact between load ball and sleeve and between load ball and table.

The resiliency of the hole or flange in the washer is approximate to the weight of the load ball, so that normally the ball closes the external hole of the sleeve, and the washer hole or flange seals the under surface of the load ball.

The invention hereinbefore described comprises in a combination of parts which will now be described with reference to the accompanying drawings—

Fig. 1 is an axial section of an assembled unit bearing.

Fig. 2 shows the sealing washer separately.

Fig. 3 is a plan of Fig. 1 on a smaller scale.

Fig. 4 is a plan of Fig. 2 on a smaller scale.

The load ball 1 is revolubly located within an outer sleeve 2 arranged eccentrically upon a circular closing cap 3 having depending sides 4 closed around sides 6 of a cup 5 formed with a boundary ball race 7 disposed between said sides 6 and a raised middle part 8 constituting the bottom of the cup. The closing is clearly shown in Fig. 1 and serves to rigidly connect cap and cup.

Within the cup 5 freely revoluble over a ring of balls 9 disposed in the ball race 7 is a table 10 disposed concentrically to the cap 3 and cup 5 and coplanar therewith, the under surface of this table being provided with a counterpart ball race 11 to the race 7 and the upper surface being provided with an inner race 12 for the load ball 1 to frictionally operate in and thereby to cause the ball 1 to revolve the table 10 relative to the ring of balls 9 which can travel the ball race 7.

Against the underside of the cap 3 is secured a disc form of washer 13 having a hole 14 engaging the lower portion of the load ball with resilient pressure. This hole 14 is provided with a depending flange providing the resilient pressure by closely split spring tongues, but the invention is not limited to spring tongues 15 but the flange or hole may be of a material inherently resilient when displaced in normal position.

The load ball 1 is slightly floated between the sleeve 2 and the table 10 by reason of the washer 13, whereby when the load ball 1 is without load its upper surface seals the outer opening of the sleeve 2 and when the load ball bears a load the sealing from without is provided by the resilient contact of the washer 13 with the under surface of the ball 1.

What I claim is:

1. An anti-frictional bearing of the kind described comprising a cup having right angled sides and an internal boundary ball race, a ring of balls operative in said ball race, a rigid table mounted on ring of balls and having on its upper surface a concentric inner ball race, an eccentric load ball operating in inner ball race, a rigid cap fitting over cup and provided with a raised taper sleeve to locate the load ball, and a washer disposed at the underside of cap and provided with a hole or flange of less diameter than the load ball and making resilient contact with the surface of the load ball.

2. An anti-frictional bearing of the kind described comprising a cup having right angled sides and between the sides and centre a ball race, a ring of balls operatively located in said ball race, a rigid table having a boundary ball race and mounted on said ring of balls for revolution and having on its upper surface a concentric and inner ball race and an eccentric load ball adapted to operate within the inner ball race of the table, and a rigid cap lying over the sides of the cup enclosing it and provided with a raised sleeve to locate the load ball relative to the cap and table, and a washer disposed between the cap and the upper edges of the sides of the cup and provided with a hole of smaller diameter than the diameter of the ball and which hole makes resilient contact with the surface of the load ball.

CLAUDE MORTIMER TOWNSEND.

References Cited in the file of this patent

UNITED STATES PATENTS

| Number | Name | Date |
|---|---|---|
| 1,970,439 | Townsend | Aug. 14, 1934 |